No. 722,140. PATENTED MAR. 3, 1903.
F. J. PRAME.
SEED CLEANER.
APPLICATION FILED OCT. 28, 1901.
NO MODEL.
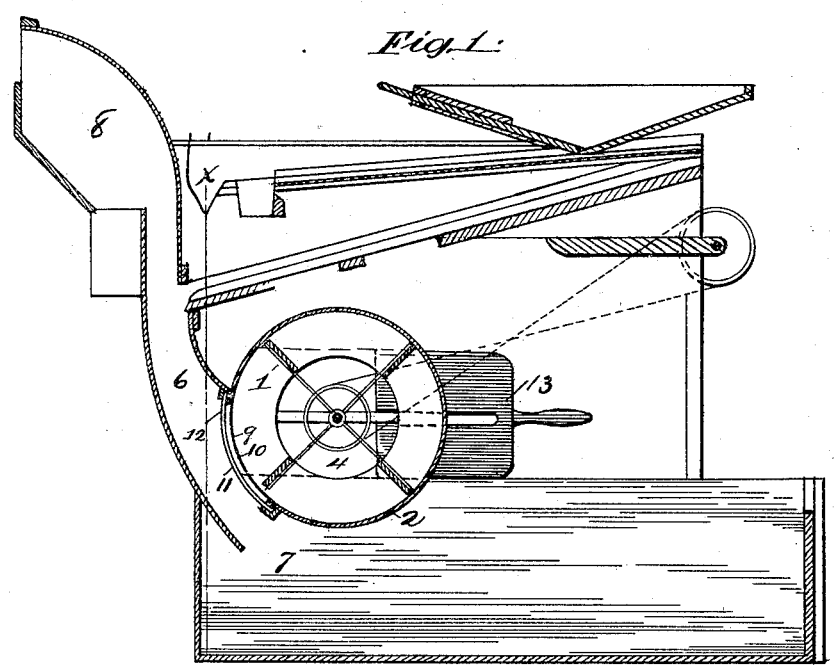
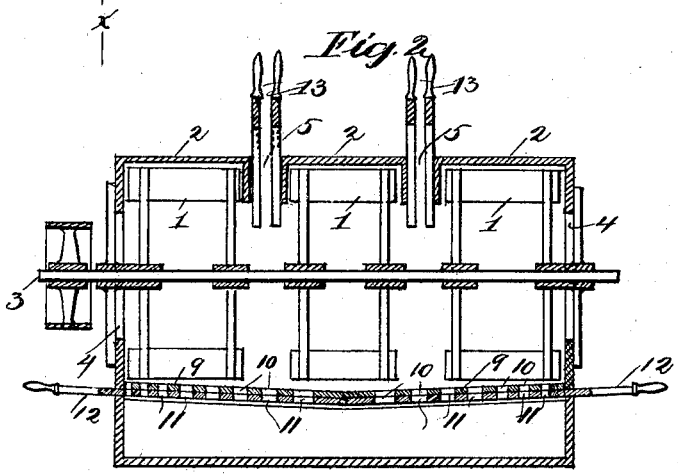
Witnesses
N. F. Eastern
Geo. O. Willet
Inventor
Frank J. Prame
by Wm. M. Monroe
Attorney
THE NORRIS PETERS CO., PHOTO-LITHO., WASHINGTON, D. C.

UNITED STATES PATENT OFFICE.

FRANK J. PRAME, OF SHILOH, OHIO.

SEED-CLEANER.

SPECIFICATION forming part of Letters Patent No. 722,140, dated March 3, 1903.

Application filed October 28, 1901. Serial No. 80,328. (No model.)

*To all whom it may concern:*

Be it known that I, FRANK J. PRAME, a citizen of the United States, and a resident of Shiloh, county of Richland, State of Ohio, have invented certain new and useful Improvements in Seed-Cleaners, of which I hereby declare the following to be a full, clear, and exact description, such as will enable others skilled in the art to which it appertains to make and use the same.

My invention relates to improvements in seed-cleaning machinery; and the objects of the invention are to provide means for distributing the air-supply from the fan uniformly to the discharge-spout and thus insure that all chaff and lighter grains shall be discharged therefrom.

My invention consists in the division of the fan-chamber into several portions, whereby the air can be admitted freely into the interior opening thereby obtained, and in means for further dividing the outlet-current to the delivery-spout, as hereinafter described, shown in the accompanying drawings, and specifically pointed out in the claim.

In the accompanying drawings, Figure 1 shows a vertical longitudinal section of the seed-cleaning machine. Fig. 2 shows a horizontal section of the same on the center line of the fan.

Heretofore it has been found that a fan rotating in a chamber and supplied from air-openings at either extremity of the chamber would not distribute the air with uniform strength of current throughout the length of the fan, but would distribute the air freely at the ends of the fan, while only a very weak draft from the fan would reach the center. Thus much chaff and dust would fall into the seed-receptacle below. My object is to avoid this inequality of draft from the fan, and I accomplish it in the following manner:

In the figures, 1 is the fan; 2, the chamber or drum in which it rotates upon its shaft 3.

4 represents the external air-inlet openings.

5 represents the openings between the divisions of the drum 2.

6 is the outlet-passage or vertical blast for the draft from the fan through, which the seed falls into the receptacle 7, and 8 is the hood through which the dust and chaff are blown.

Across the opening connecting the fan-inclosure with the vertical blast is placed a partition 9, in which are provided openings 10, which correspond with openings 11 in slides or dampers 12, varying in width of area and graduated from smaller at the extremities to much larger at the center, the combined areas of the openings being equal to the air-inlet openings in the extremities of the drum-sections. This damper can be pulled out to close all the openings or open them proportionally. By means of this device the air must be evenly distributed, since the openings near the outer extremities of the drum are too small to allow more than the desired proportion of air to enter, which being turned away enters the openings farther toward the center until the entire area of the discharge-passage is filled with the blast, no one portion receiving more current from the fan than another.

The drum is shown divided into three portions; but more or less divisions could be made and other forms of dampers employed without departing from the spirit of my invention.

Damper-slides, as 13, can be employed to shut off as much of the air-supply to the drum-sections as may be desired if the draft becomes excessive, since the draft must be regulated to adapt it to the weight of the seed undergoing the cleaning process.

Having described my invention, what I claim as new, and desire to secure by Letters Patent, is—

The combination with a drum, air-inlets thereto, a fan and a blast-passage therefrom, of means for distributing the air equally to said passage consisting of apertures in the side walls of the drum, said apertures being smaller at the extremities of the drum than at the center, and means for proportionally opening and closing said apertures, substantially as described.

In testimony whereof I have signed my name to this specification in the presence of two subscribing witnesses.

FRANK J. PRAME.

Witnesses:
THOMAS B. STAIRS,
GEORGE B. KAYLOR.